US010290204B2

(12) United States Patent
Quaiser et al.

(10) Patent No.: US 10,290,204 B2
(45) Date of Patent: May 14, 2019

(54) MAINTENANCE SYSTEM AND METHOD FOR MAINTENANCE OF A DOOR ARRANGEMENT

(71) Applicant: FRABA B.V., SG Heerlen (NL)

(72) Inventors: Andre Quaiser, Bonn (DE); Bernd Kagerer, Krefeld (DE)

(73) Assignee: FRABA B.V., SG Heerlen (NL)

( * ) Notice: Subject to any disclaimer, the term of this patent is extended or adjusted under 35 U.S.C. 154(b) by 437 days.

(21) Appl. No.: 15/046,460

(22) Filed: Feb. 18, 2016

(65) Prior Publication Data

US 2016/0245009 A1 Aug. 25, 2016

(30) Foreign Application Priority Data

Feb. 20, 2015 (DE) ........................ 10 2015 102 405

(51) Int. Cl.

| | |
|---|---|
| ***G05B 13/02*** | (2006.01) |
| ***G08C 17/02*** | (2006.01) |
| *E05F 15/603* | (2015.01) |
| *E05F 15/70* | (2015.01) |

(52) U.S. Cl.

CPC ............ *G08C 17/02* (2013.01); *E05F 15/603* (2015.01); *E05F 15/70* (2015.01); *E05Y 2900/106* (2013.01); *G08C 2201/93* (2013.01)

(58) Field of Classification Search

CPC ..... G08C 17/02; E05F 15/70; E05Y 2900/106

USPC .......................................................... 700/275

See application file for complete search history.

(56) References Cited

U.S. PATENT DOCUMENTS

2002/0137460 A1* 9/2002 Sun .................... G07C 9/00857 455/41.2

2011/0287757 A1* 11/2011 Nykoluk ................ G08C 17/02 455/419

FOREIGN PATENT DOCUMENTS

DE 10 2013 107 016 A1 7/2014

DE 10 2014 103 456 A1 9/2015

* cited by examiner

*Primary Examiner* — Connie C Yoha

(74) *Attorney, Agent, or Firm* — Norman B. Thot

(57) ABSTRACT

A maintenance system for a door arrangement. The door arrangement includes a door member and a drive unit configured to drive the door member. The maintenance system includes a control device comprising a motor control unit configured to control the drive unit and a non-temporary memory configured to store door data, a central maintenance data memory comprising maintenance data for at least one of configuring, monitoring and modifying the control device, a first bidirectional data connection, a second bidirectional data connection, and a mobile maintenance device. The door data is retrievable from the non-temporary memory. The mobile maintenance device is configured to be coupled to the non-temporary memory of the control device via the first bidirectional data connection to maintain the door arrangement, and to be directly or indirectly coupled to the central maintenance memory via the second bidirectional data connection.

7 Claims, 1 Drawing Sheet

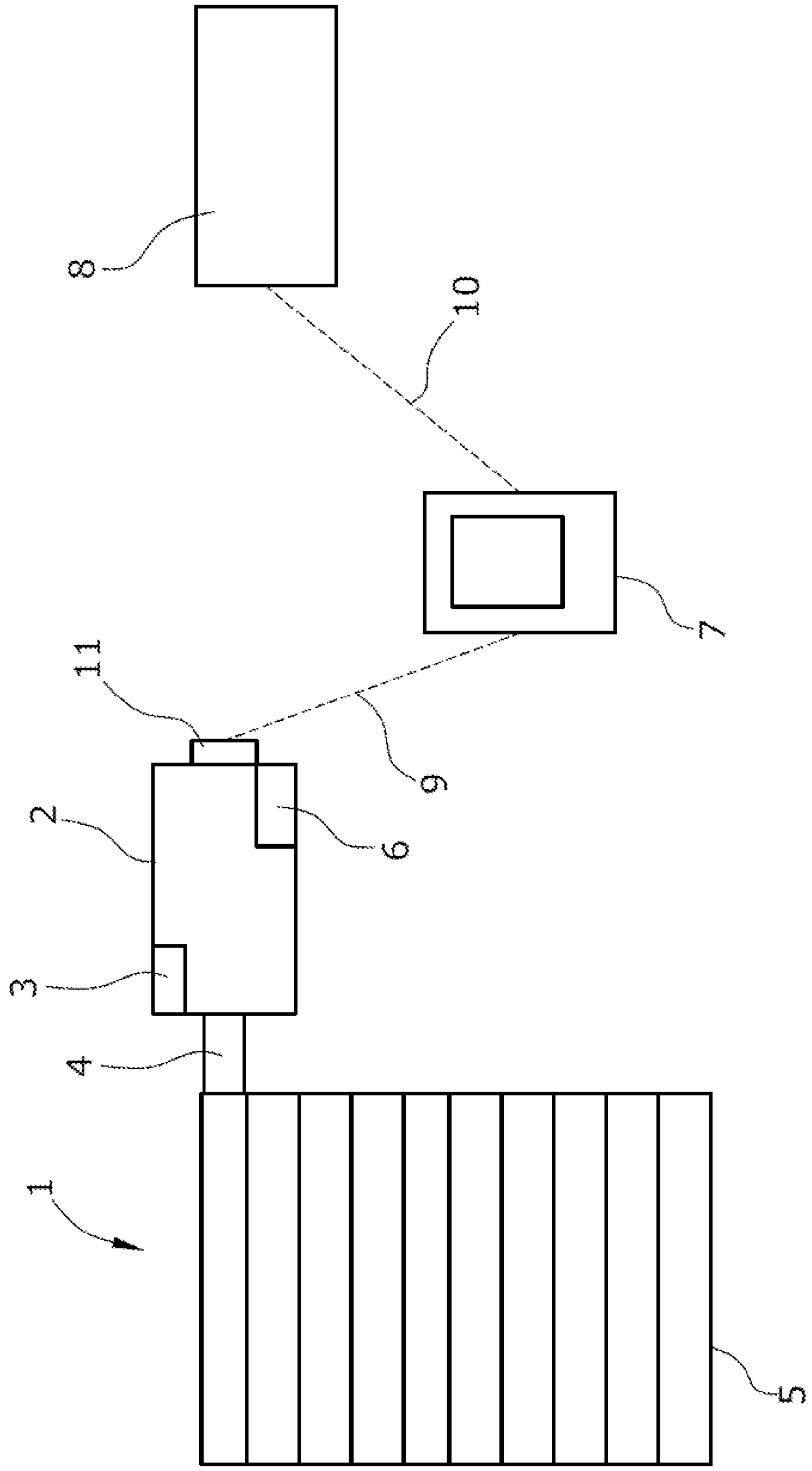
8
10
7
11
9
2
6
3
4
1
5

MAINTENANCE SYSTEM AND METHOD FOR MAINTENANCE OF A DOOR ARRANGEMENT

CROSS REFERENCE TO PRIOR APPLICATIONS

Priority is claimed to German Patent Application No. DE 10 2015 102 405.5, filed Feb. 20, 2015. The entire disclosure of said application is incorporated by reference herein.

FIELD

The present invention relates to a maintenance system for a door arrangement. The present invention further relates to a method for maintenance of a door arrangement.

BACKGROUND

The use of control devices for remote-controlled building automation systems, wherein the operation of in-house installations such as, for example, door drives and lighting systems, is performed by dialing a mobile operating device into a network while the signal emitted by the mobile operating device is forwarded via the network to the actuation device of the in-house installation, has previously been described. Such a system has been described, for example, in DE 10 2013 107 016 where, via a bidirectional connection, a user can operate in-house installations by use of various mobile operating devices such as, for example, smartphones, laptops, or PCs, and to read out or obtain a visual display of current information about the in-house installations. Intervention in the control device of an in-house installation, for example, for maintenance of a control device of a door arrangement, is not, however, possible with such a system. Remote maintenance systems have further been described in the field of in-house technology where access to an in-house installation is possible via a data connection.

SUMMARY

An aspect of the present invention is to provide a maintenance system for a door arrangement where the maintenance of a control device of a door arrangement is safeguarded in a simple manner.

In an embodiment, the present invention provides a maintenance system for a door arrangement. The door arrangement includes a door member and a drive unit configured to drive the door member. The maintenance system includes a control device comprising a motor control unit configured to control the drive unit and a non-temporary memory configured to store door data, a central maintenance data memory comprising maintenance data for at least one of configuring, monitoring and modifying the control device, a first bidirectional data connection, a second bidirectional data connection, and a mobile maintenance device. The door data is retrievable from the non-temporary memory. The mobile maintenance device is configured to be coupled to the non-temporary memory of the control device via the first bidirectional data connection to maintain the door arrangement, and to be directly or indirectly coupled to the central maintenance memory via the second bidirectional data connection.

BRIEF DESCRIPTION OF THE DRAWINGS

The present invention is described in greater detail below on the basis of embodiments and of the drawing in which:

FIG. 1 shows a schematic view of the configuration of a maintenance system for a door arrangement.

DETAILED DESCRIPTION

In an embodiment, the present invention provides a maintenance system which comprises a control device having a motor control unit for controlling a drive unit for driving a door member, and having a non-temporary memory for storage of door data, with the door data being retrievable by the motor control unit. The maintenance system further comprises a central maintenance data memory containing maintenance data for configuring, monitoring and/or modifying at least one control device, and a mobile maintenance device which, for maintenance of the door arrangement, can be coupled to the non-temporary memory of the control device via a first bidirectional data connection and which can be directly or indirectly coupled to the central maintenance memory via a second bidirectional data connection. It is thereby made possible for a technician to download the current data for maintenance in a particularly simple and fast manner during a maintenance procedure. Faulty working procedures caused by the unavailability of information to the technician can be excluded. "Maintenance data" will furthermore immediately be forwarded to a central maintenance data memory of a manufacturing company. Access to the door data and maintenance data, respectively, does not necessarily take place in situ. In this context, the definition of a mobile maintenance device is to be understood in the sense that, under the aspect of control technology, said device does not belong to the central maintenance data memory.

In an embodiment of the present invention, the control device can, for example, comprise a radio transmitter and a radio receiver which allow a connection with the mobile maintenance device to be built up in a simple manner. The first data connection and/or the second data connection can, for example, be a radio connection, a network connection, an internet connection, a mobile phone connection, and/or some other radio connection.

Examples of door data include a serial number, a door position, a door type, a number of closing cycles, hardware information, a fault message, and/or operational states of a door arrangement.

In an embodiment of the present invention, the motor control unit and the non-temporary memory can, for example, be provided separately so as to provide that the door data required for the maintenance process will not be overwritten.

Under the aspect of efficient processing, the central maintenance data memory should include maintenance data of at least two door arrangements.

In an embodiment of the present invention, the mobile maintenance device can, for example, be a laptop, a smartphone, or a tablet PC. By using the mobile maintenance device, it is in particular possible to retrieve door data from the non-temporary memory, to modify the maintenance data, to forward the maintenance data to the central maintenance data memory, and/or to store the maintenance data in the central maintenance memory. In an embodiment of the present invention, the mobile maintenance device can, for example, be adapted to retrieve maintenance data from the central maintenance data memory, to modify the maintenance data, to forward the maintenance data to the non-temporary memory, and/or to store the maintenance data in the non-temporary memory.

The mobile maintenance device can be permanently coupled to the central maintenance data memory in order to provide a continuous data reconciliation.

The present invention also provides a method for the maintenance of a door arrangement, wherein a control device is provided which comprises a motor control unit to control a drive unit to drive a door arrangement, and a non-temporary memory for storing door data, wherein the door data can be retrieved by the motor control unit, the method comprising the steps of:

establishing a bidirectional connection between a mobile maintenance device and the non-temporary memory;

reading out the door data stored in the non-temporary memory;

matching the read-out door data with predetermined maintenance data; and in case of non-congruence between the door data and the maintenance data, overwriting the door data stored in the non-temporary memory with the maintenance data.

In an embodiment of the present invention, it can be advantageous if, prior to the matching of the read-out door data, a read-out of the maintenance data from the central maintenance data memory is performed by the mobile maintenance device and the matching is performed by the mobile maintenance device.

It is safeguarded that the most recent data of the maintenance data memory is available to the maintenance process since, prior to the matching of the read-out door data, the read-out door data is transmitted to the central maintenance data memory and since the matching is performed by the mobile maintenance device.

The present invention will hereinafter be described in greater detail via an embodiment under reference to the accompanying drawing.

FIG. 1 shows a schematic view of the configuration of a maintenance system for a door arrangement 1. A control device 2 of the door arrangement 1 comprises a motor control unit 3 to control a drive unit 4 operative, for example, to lower and lift a door member 5, and a non-temporary memory 6. In the non-temporary memory 6, which is arranged separately from motor control unit 3, door data of door arrangement 1 are stored. Possible door data in this regard can, for example, be a serial number, a door position, a door type, a number of closing cycles, hardware information, a fault message, or operational states of the door arrangement 1.

The door data stored in the non-temporary memory 6 will be read, via a first bidirectional data connection 9, by a mobile maintenance device 7, for example, a laptop, a smartphone, or a tablet PC. A radio transceiver 11 is provided in control device 2 for the first bidirectional data connection 9.

The mobile maintenance device 7 is connected to a central maintenance data memory 8 via a second bidirectional data connection 10. The central maintenance data memory 8 is located on the server of a door manufacturer and contains a plurality of maintenance data of various door arrangements. Via the second bidirectional data connection 10, data read out from the non-temporary memory 6 by the mobile maintenance device 7 is forwarded to the central maintenance data memory 8, is modified by the mobile maintenance device 7, and is stored as maintenance data in the central maintenance data memory 8.

In a similar manner, maintenance data stored in the central maintenance data memory 8 can be transmitted, via the first bidirectional data connection 9 and via the second bidirectional data connection 10, from the central maintenance data memory 8 by way of the mobile maintenance device 7 to the non-temporary memory 6, and be stored in the non-temporary memory 6.

Maintenance of the door arrangement 1 can now proceed as follows: First, for example, by intervention of a technician, a bidirectional connection is established between the mobile maintenance device 7 and the non-temporary memory 6. The door data stored in the non-temporary memory 6 is then read out. With the aid of the serial number of the door arrangement, a clear referencing to the maintenance data stored in the central maintenance data memory 8 can be performed. The current maintenance data will then be downloaded to the mobile maintenance device so that a matching process between the read-out door data and the predefined maintenance data can thereafter be carried out so that the technician can start the required maintenance work. The matching of the door data and the maintenance data can alternatively also be carried out in the central maintenance data memory 8. The read-out door data can also be transmitted to the central maintenance data memory 8 for documentation and subsequent evaluation.

It can also be provided that the mobile maintenance device 7 is indirectly coupled to the central maintenance memory 8 in that a second data connection exists between the control device 2 and the central maintenance memory 8, wherein the mobile maintenance device 7 is in this case first coupled via the first bidirectional data connection 9 to control device 2. An indirect connection can of course also be established in that the mobile maintenance device 7 is connected to control device 2 via the second bidirectional data connection 10 and via the above-mentioned second data connection between the control device 2 and the central maintenance memory 8.

Control device 2 is only schematically represented in FIG. 1. Control device 2 can consist of a plurality of component parts which may also be provided independently from each other, for example, sensors, circuit boards, actuators etc. Reference is thereby made to DE 10 2014 103 456 for deeper understanding.

The present invention is not limited to embodiments described herein; reference should be had to the appended claims.

LIST OF REFERENCE NUMERALS

1 door arrangement
2 control device
3 motor control unit
4 drive unit
5 door member
6 non-temporary memory
7 mobile maintenance device
8 central maintenance data memory
9 first bidirectional data connection
10 second bidirectional data connection
11 radio transceiver

What is claimed is:

1. A maintenance system for a door arrangement comprising a door member and a drive unit which is configured to drive the door member, the maintenance system comprising:

a control device comprising, a motor control unit configured to control the drive unit, a radio transceiver, and a non-temporary memory configured to store door data, the door data being retrievable from the non-temporary memory;

a central maintenance data memory comprising maintenance data for at least one of configuring, monitoring and modifying the control device;

a first bidirectional data connection;

a second bidirectional data connection; and a mobile maintenance device configured to be coupled to the non-temporary memory of the control device via the first bidirectional data connection to maintain the door arrangement, and to be directly or indirectly coupled to the central maintenance memory via the second bidirectional data connection, wherein, the mobile maintenance device is further configured to, retrieve the maintenance data from the central maintenance data memory, modify the maintenance data, forward the maintenance data to the non-temporary memory, store the maintenance data in the non-temporary memory, retrieve the door data from the non-temporary memory, modify the door data, forward the door data to the central maintenance data memory, and store the door data in the central maintenance memory, and the central maintenance data memory comprises maintenance data of at least two door arrangements.

2. The maintenance system as recited in claim 1, wherein at least one of the first bidirectional data connection and the second bidirectional data connection is a radio connection.

3. The maintenance system as recited in claim 2, wherein the radio connection is a network connection, an internet connection, a mobile phone connection, or an other radio connection.

4. The maintenance system as recited in claim 1, wherein the door data comprises at least one of, a serial number, a door position, a door type, a number of closing cycles, hardware information, a fault message, and an operational state of the door arrangement.

5. The maintenance system as recited in claim 1, wherein the motor control unit and the non-temporary memory are provided separately.

6. The maintenance system as recited in claim 1, wherein the mobile maintenance device is a laptop, a smartphone, or a tablet PC.

7. The maintenance system as recited in claim 1, wherein the mobile maintenance device is permanently coupled to the central maintenance data memory.

* * * * *